(12) United States Patent (10) Patent No.: US 12,697,799 B2
Winter et al. (45) Date of Patent: Aug. 4, 2026

(54) COMPOSITE SYSTEM TO SHIELD AND PROTECT BATTERIES FROM RADIATION AND FIRE

(71) Applicant: Cuylits Holding GmbH, Bersenbrück (DE)

(72) Inventors: Florian Winter, Osnabrück (DE); Diederik Cuylits, Bersenbrück (DE)

(73) Assignee: Cuylits Holding GmbH, Bersenbrück (DE)

( * ) Notice: Subject to any disclaimer, the term of this patent is extended or adjusted under 35 U.S.C. 154(b) by 190 days.

(21) Appl. No.: 18/485,073

(22) Filed: Oct. 11, 2023

(65) Prior Publication Data

US 2024/0116266 A1 Apr. 11, 2024

(30) Foreign Application Priority Data

Oct. 11, 2022 (EP) ..................................... 22200807

(51) Int. Cl.
*B32B 5/26* (2006.01)
*B32B 5/02* (2006.01)
(Continued)

(52) U.S. Cl.
CPC ................ *B32B 5/26* (2013.01); *B32B 5/022* (2013.01); *B32B 15/14* (2013.01); *B32B 15/18* (2013.01); *B32B 15/20* (2013.01); *B32B 37/1207* (2013.01); *H01M 50/383* (2021.01); *B32B 2037/1223* (2013.01); *B32B 2250/40* (2013.01);
(Continued)

(58) Field of Classification Search
CPC ........... B32B 7/027; B32B 5/022; B32B 5/26; B32B 5/262; B32B 5/265; B32B 5/024; B32B 7/025; B32B 7/12; B32B 2262/16; B32B 2307/7376; B32B 15/14; B32B 15/18; B32B 15/20; B32B 17/02; B32B 33/00; B32B 37/12; B32B 37/1207; B32B 2037/1215; B32B 2037/1223; B32B 2037/212; B32B 2037/308; B32B 2037/732; B32B 2250/40; B32B 2255/02; B32B 2255/205; B32B 2255/26; B32B 2255/28; B32B 2260/021; B32B 2260/046; B32B 2260/101; B32B 2260/106; B32B 2260/108; B32B 2260/12; B32B 2260/14; B32B 2305/18; B32B 2311/30; B32B 2311/24; B32B 2315/086; B32B 2457/04; B32B 2457/10; B32B 2605/08;
(Continued)

(56) References Cited

U.S. PATENT DOCUMENTS 5,735,098 A 4/1998 Kanai et al.
6,399,737 B1 6/2002 Elkovitch
(Continued)

FOREIGN PATENT DOCUMENTS

DE 102010043899 A1 5/2012
JP H07300912 A 11/1995
(Continued)

*Primary Examiner* — Camie S Thompson
(74) *Attorney, Agent, or Firm* — Brown & Michaels, PC

(57) ABSTRACT

A composite system is described, comprising at least one carrier layer; at least one layer designed as a fire protection fleece; and at least one component for shielding electrical, magnetic and/or electromagnetic radiation. Furthermore, a method for its manufacture and use is described.

12 Claims, 2 Drawing Sheets

(51) Int. Cl.

| | |
|---|---|
| *B32B 15/14* | (2006.01) |
| *B32B 15/18* | (2006.01) |
| *B32B 15/20* | (2006.01) |
| *B32B 37/12* | (2006.01) |
| *H01M 50/383* | (2021.01) |

(52) U.S. Cl.

CPC ... *B32B 2260/021* (2013.01); *B32B 2260/046* (2013.01); *B32B 2262/101* (2013.01); *B32B 2262/12* (2013.01); *B32B 2262/16* (2021.05); *B32B 2305/076* (2013.01); *B32B 2305/18* (2013.01); *B32B 2307/212* (2013.01); *B32B 2307/3065* (2013.01); *B32B 2311/24* (2013.01); *B32B 2311/30* (2013.01); *B32B 2315/085* (2013.01); *B32B 2457/10* (2013.01)

(58) Field of Classification Search

CPC .... H01M 50/24; H01M 50/124; H01M 50/44; H01M 50/383; H01M 2220/20; A62C 2/06

USPC ......................................................... 442/331

See application file for complete search history.

(56) References Cited

U.S. PATENT DOCUMENTS

| | | | |
|---|---|---|---|
| 2005/0170238 | A1 | 8/2005 | Abu-Isa et al. |
| 2011/0064997 | A1 | 3/2011 | Peskar et al. |
| 2011/0192564 | A1 | 8/2011 | Mommer et al. |
| 2012/0022533 | A1 | 1/2012 | Buettler et al. |
| 2021/0074960 | A1 | 3/2021 | Stude et al. |
| 2021/0376405 | A1 | 12/2021 | Browning et al. |
| 2022/0069402 | A1 | 3/2022 | Winter et al. |

FOREIGN PATENT DOCUMENTS

| | | | | |
|---|---|---|---|---|
| WO | 2014018107 | A1 | 1/2014 | |
| WO | WO-2020070275 | A1 * | 4/2020 | ............. A62C 2/065 |
| WO | 2021156095 | A1 | 8/2021 | |

* cited by examiner 1
5
2
5
3
5
4

6
5
1
5
2
5
3
5
4
5
7

8          8

COMPOSITE SYSTEM TO SHIELD AND PROTECT BATTERIES FROM RADIATION AND FIRE

This patent application claims the benefit and priority of European Patent Application No. 22200807.0, entitled "Fire protection device with composite system, composite system and battery pack with fire protection device" filed Oct. 11, 2022, the disclosure of which is incorporated by reference in its entirety as part of the present application.

BACKGROUND

The present invention relates to a composite system which can be used for simultaneous fire protection and electromagnetic shielding (EMI shielding). A further object of the present invention is a method for manufacturing this composite system according to the present invention and the use of the composite system according to the present invention for simultaneous fire protection and EMI shielding, in particular in the field of batteries.

There is currently a trend in the automotive industry to replace internal combustion engines with electric motors or a combination of an electric motor and an internal combustion engine, thereby lowering the environmental impact of automobiles by reducing (hybrids) or completely eliminating (electric vehicles) vehicle emissions. However, this change in propulsion technology is not without technological hurdles, as the use of an electric motor entails the need for low-cost, rechargeable batteries (accumulators) with high energy density, long service life and diverse operating conditions. In addition, it is essential that a vehicle's battery does not pose an unreasonable health hazard either during use of the vehicle or during storage.

Rechargeable batteries, such as lithium-ion cells, are more prone to thermal runaway than primary cells. Thermal runaway occurs when the internal reaction rate increases to the point where more heat is generated than can be removed from the battery, resulting in a further increase in both the reaction rate and heat generation. Eventually, the amount of heat generated is large enough that it leads to the destruction of the battery cell (e.g., by overpressure (bursting) or by the emission of gases). In addition, this can lead to the development of a fire.

Thermal runaway can be caused, for example, by a short circuit within the cell, improper use of the cell, manufacturing defects or extreme outside temperatures. In the case of a battery pack used in an electric vehicle, which contains several battery cells, a car accident can be the cause of several cells within the battery pack suffering thermal runaway at the same time.

During a thermal runaway, a large amount of thermal energy is released rapidly, heating the entire cell to a temperature of 850° C. or more. The increased temperature of the thermal runaway cell also raises the temperature of adjacent cells within the battery pack. If the temperature of the neighbouring cells increases unhindered, they can also become thermally runaway. This cascade effect can mean that when a single cell is thermally runaway, all cells in the entire battery pack end up thermally runaway.

Battery packs have an enclosure that serves to protect the battery cells and contains devices that serve to air-condition and control the battery cells. By using specially designed enclosures, the risk caused by a short circuit during storage and/or handling can be reduced.

Measures are known from the prior art to improve the fire protection of battery packs, for example in the automotive sector.

A battery housing made of a glass fibre reinforced plastic is known from US 2005/01700238 A1.

A battery pack is known from US 2012/0225331 A1, in which a protective layer made of a glass fibre material coated with a polymer is arranged inside a housing made of stable material. If a battery fails, the fabric retains the resulting gases. The housing absorbs the resulting forces.

From US 2011/0192564 A a composite system is known, which is used for the protection of batteries. The composite system is shown in FIG. 1 of the prior art, according to which the upper layer (108) is an adhesive layer via which the composite system is connected to an electrical energy storage device, such as a battery. This adhesive layer is followed by a foam layer (102), which in turn is connected to an outer layer (110). According to US 2011/0192564 A, the outer layer can be a glass fibre fleece. In this arrangement, so-called ablative-acting compounds are optionally present in the foam layer (102). A disadvantage of this structure known from US 2016/0192564 A is that in the case of a heat effect, the ablative-acting compound can only act within the composite system and thus its functionality is limited. A direct effect of the ablative connection on the battery is limited by the adhesive layer provided between the fire protection layer and the battery.

From US 2011/064997 A a battery is known which is provided in a housing. On the one hand, the housing is formed by an ionomer layer which is in direct contact with the electrochemical cell. Further outwards (i.e., on the side of the ionomer layer opposite the electrochemical cell) a glass fibre fleece is provided. In the context of the teaching of US2011/064997 A, the ionomer layer may comprise an intumescent component, such as graphite. The glass fibre nonwoven used in the teaching of US 2011/064997 A thus serves as a support layer and is not directly applied to the housing of the electrochemical cell (battery). This composite system known from the prior art has the disadvantage that the glass fibre fleece used as a carrier material does not have sufficient stiffness and thus a dimensionally stable embossing of the composite system is not possible. Furthermore, the production of an ionomer layer provided with an intumescent compound is complex and cost-intensive.

WO 2014/018107 A relates to a laminate as a fire barrier for use in thermal and acoustic insulation. In a specific embodiment, a polyetheretherketone film is provided with a scrim and a thermal seal on one side and a silicone adhesive layer, a glass fibre layer and a fire barrier layer on the other side of the polyetheretherketone film. The production of the six-member laminate is costly because, in particular, a glass fibre fabric is first applied to the silicone adhesive and then a fire barrier layer is applied in a separate process step. Furthermore, the composite material is not suitable for plastic deformation, as none of the aforementioned layers has sufficient stiffness.

JP H07300912 A discloses a composite system which is shown in FIG. 2. According to this, an adhesive layer is applied to a lower layer, which represents the carrier layer 2 and is formed by a glass fibre fabric layer. This adhesive layer is marked with reference 6. Subsequently, a heat-reducing layer (10) is arranged on the adhesive layer. This heat-reducing layer (10) may contain an ablative agent. Subsequently, a non-combustible layer (4) is arranged. The resulting composite body thus comprises a glass fibre fabric as a carrier material, which generally does not have sufficient stiffness for plastic deform-ability. Furthermore, the production is complex and cost-intensive.

U.S. Pat. No. 5,735,098 describes a fire-retardant composition containing an ablative-functionalizing compound and glass fibre. However, the fire protection composition of this prior art does not comprise a glass fibre fleece, nor a carrier material that has sufficient stiffness to plastically deform a possibly resulting composite body.

A battery box, also called a battery housing, is described in DE 10 2010 043 899 A. In this solution, a battery housing with a housing cover, which is formed according to an outer contour of a battery cell and a housing base, is attached to a hood-shaped housing cover. The battery housing is made of a plastic that is difficult to ignite. Such a solution does not withstand prolonged heat generation.

In addition to the fire protection issue, shielding issues of electrical, magnetic and/or electromagnetic radiation also play a role in the meantime. For this reason, solutions are also known in which fire protection layers are combined with electromagnetic compatibility layers (EMC or EMI layers). This additional layer serves to improve the electromagnetic compatibility (EMC) and thus preferably to shield against other drive and control/regulation elements of the vehicle.

From WO 2021/156095 A such a cover structure for a battery of an electric vehicle is known, whereby the cover structure is made of a SMC base body (Sheet Molding Compound) with a fire protection coating and is provided with an EMC layer. The fire protection coating, the SMC base body and the EMC layer are bonded together in a single operation, preferably by means of a bonding press. The fire protection coating and the EMC layer are provided on opposite sides of the SMC base body. In this prior art, the fire protection coating is formed by a mica plate or a micanite moulding. The core idea of WO 2021/156095 A is to create a permanently tacky layer on a SMC base body, for which a powder adhesive is used. Therefore, according to this publication, layers can only be adhesively arranged above and below the SMC base body.

US 2021/376405 A discloses a thermal composite material as a thermal barrier for use in battery packs of electric and hybrid vehicles, the composite material comprising a porous core layer, flame retardant layers disposed on both sides of the porous core layer, and at least one radiation barrier layer disposed between the porous core layer and a flame-retardant layer. FIG. 6 of US 2021/376405 A describes a composite material having an assembly of a first flame barrier layer, a radiation barrier layer, an upper side of the radiation barrier layer, a porous support layer having an upper side and a lower side, and a second flame barrier layer. The porous support layer may be formed as a thermally expandable layer of a glass mat, ceramic mat or other flammable mat, or a rubber-based felt with expandable particles such as vermiculite or expandable graphite dispersed in the rubber matrix. The radiation barrier layer may be formed from a metal foil such as an aluminium foil, a copper foil, or metal foil tapes such as 3M™ Aluminum Foil Shielding Tape 1170 manufactured by 3M (St. Paul, Minn). Other exemplary mate-rials may include metallic shim mate-rial or metal coated polymer composites. The use of alu-minium-coated glass or basalt fibres is not disclosed in US 2021/376405 A, nor is the specific structure of the composite system described below.

US 2021/074960 A discloses a multilayer thermal insu-lation element for thermal insulation of a battery, wherein the thermal insulation element comprises a first cover layer, a second cover layer and an intermediate layer provided between the cover layers, whereby the intermediate layer comprises at least one heat-resistant layer, wherein the layer is formed from a needle mat and/or wherein the cover layers are of weak fabric and the thermal insulation element is thus compressible and pliable as a whole. In FIG. 1A of US 2021/074960 A, a composite material is described which has a structure of support layers, an intermediate layer with a fibre layer, preferably of a needle mat and/or a bonded non-woven fabric, an intermediate layer for thermal insula-tion, which may in particular be formed of an aluminium foil. The use of glass or basalt fibres coated with aluminium is not disclosed in US 2021/074960 A, nor is the specific structure of the composite system described below.

US 2022/069402 A discloses a composite system com-prising a backing layer, an adhesive layer, and a fire pro-tection layer containing at least one ablative compound. The composite system may also have at least one stainless steel foil as a barrier for the separation of metal particles from the battery as an alternative to a corresponding coated glass fibre fleece or a coated glass fibre fabric (as a carrier layer). Corresponding layer thicknesses of the stainless steel foils are between 0.02 and 0.40 mm, preferably 0.04 and 0.30 mm, more preferably 0.05 and 0.20 mm. The use of glass or basalt fibres coated with aluminium is not disclosed in 2022/069402 A, nor is the specific structure of the composite system described below.

U.S. Pat. No. 6,399,737 a composition comprising a thermoplastic resin and about 1 to about 30% by weight of an electromagnetic shielding agent, wherein the electromag-netic shielding agent comprises a metal-coated fibre and a metal fibre, and wherein the composition after moulding has a shielding effectiveness of at least about 10 decibels as measured according to ASTM D4935.

These composite systems and materials have the disad-vantage of insufficient fire protection, insufficient electrical shielding and only limited plastic deformability. In particu-lar, the composite systems and materials of the prior art are disadvantageous in that they do not simultaneously provide sufficient fire protection and/or electrical shielding while at the same time offering good plastic deformability.

SUMMARY

According to an embodiment, composite system includes at least one carrier layer, at least one fire protection layer, and at least one component for shielding at least one from the group consisting of electrical, magnetic, and electromag-netic radiation. The at least one component for shielding is formed by at least one from the group consisting of (1) an aluminium foil placed outside the at least one carrier layer and the at least one fire protection layer and (2) at least one from the group consisting of glass fibres coated with metal and basalt fibres coated with metal.

The composite system can be used for fire protection of batteries.

A method of producing a composite system can be produced by bonding individual layers using hot-melt adhe-sive under the action of pressure.

DETAILED DESCRIPTION

Figure 1:
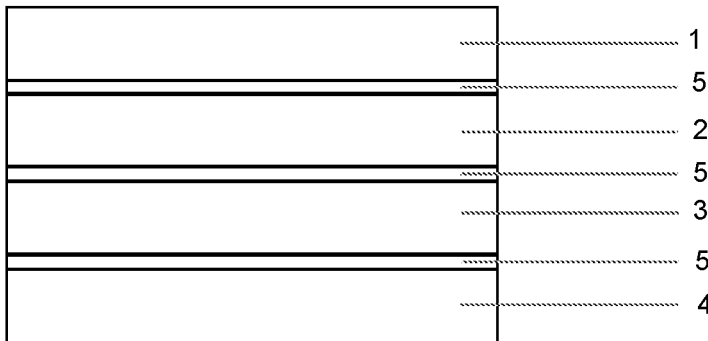
FIG. 1 shows a schematic illustration of a composite system, according to an embodiment.

In contrast, the invention is based on the object of creating a composite system which, on the one hand, meets the fire protection requirements and, on the other hand, the EMC requirements, which can be manufactured with little effort and which is plastically deformable without causing layer fractures or delamination during the deformation process. Three-dimensional deformability of the composite system according to the present invention is necessary so that the composite system can be adapted to the three-dimensional shape of the battery.

The invention is further based on the object of creating a method for manufacturing such a cover structure.

These objects are solved with regard to a composite system including: at least one carrier layer including a silicate fibre needle mat and a stainless steel foil; at least one carrier protection layer; and at least one component for shielding at least one from the group consisting of electrical, magnetic, and electromagnetic radiation, the at least one component for shielding formed by at least one from the group consisting of (1) an aluminium foil placed outside the at least one carrier layer and the at least one fire protection layer and (2) at least one from the group consisting of glass fibres coated with metal and basalt fibres coated with metal, and with regard to a method of producing this composite system wherein the individual layers are provided and bonded together by means of a hot-melt adhesive and under the action of pressure.

Advantageous further embodiments of the invention are the subject of the dependent claims.

According to the present invention, a composite system comprising a layer system of (a) at least one carrier layer; and (b) at least of a layer designed as a fire protection fleece, is foreseen.

The composite system according to the invention is then characterised in that it comprises (c) at least one component for shielding electrical, magnetic and/or electromagnetic radiation and the at least one component (c) is formed either by an aluminium foil arranged outside the layers (a) and (b) and/or by glass or basalt fibres coated with one or more metals.

The composite system according to the invention has proven to be highly effective for simultaneous fire protection and EMC shielding. In fundamental contrast to the prior art formed, for example, by the publication WO 2021/156095 A, the composite system proposed according to the present invention has a fire protection fleece.

By using a fire protection fleece in the sense of the present invention, various technical advantages are achieved. On the one hand, a plastic deformability is achieved by the fire protection fleece. The resulting moulded body is not brittle and easier to process. In combination with the other layers of the composite system according to the present invention, there is a potentially better fire protection, also compared to common materials such as glimmer and mica. In addition, materials such as mica are in particular disadvantageous in that they come from unclear sources, whereby problems may arise from supply chain law or compliance or sustainability problems. In the context of the present invention, a non-woven fabric is understood to be an assembly of fibres of limited length, continuous fibres (filaments) or chopped yarns of any type and origin, which have been joined together in some way to form a non-woven fabric (a fibre layer, a fibre pile) and bonded together in some way. The nonwovens according to the present invention are flexible textile fabrics, i.e. they are relatively easy to bend, their main structural elements are textile fibres and they have a comparatively small thickness compared to their length and width. A detailed description of the nonwoven fire fabric is given below.

In the prior art WO 2021/156095 A, the fire protection layer formed by the non-woven fabric and the component for shielding electronic, magnetic and/or electromagnetic radiation are separated from each other by an SMC base body. This layered structure according to WO 2021/156095 A is avoided in the context of the present invention, as described further below. Furthermore, the composite system of WO 2021/156095 A generally does not provide for a fire protection fleece.

In the context of the present invention, the at least one component (c) for shielding electrical, magnetic and/or electromagnetic radiation may be an aluminium foil (first embodiment of the present invention) and/or glass or basalt fibres coated with aluminium (second embodiment of the present invention). These two embodiments are described further below.

The composite system according to the present invention as a fire protection device, which can be designed, for example, as a mat or plate, can be fitted, for example, as heat and/or fire protection under the housing cover of a battery pack for use in vehicles, in order, on the one hand, to protect the battery cells from external temperatures and/or the effects of fire and, on the other hand, to prevent heat and/or fire from spreading to other components of the vehicle and/or the passenger cell in the event of thermal runaway of battery cells.

Usually, the composite system according to the present invention is in direct contact with the battery.

The individual layers of the composite system according to the present invention are described below.

Carrier Layer

The support layer of the composite system, which can also be designed as an insulation layer, can be rigid or flexible.

The carrier layer comprises, for example, a glass fibre fleece or glass fibre fabric made of AES glass, E glass, ECR glass, silica glass, S glass, R glass, M glass, C glass, D glass, AR glass, T glass and/or Q glass. Silica glass is preferred here. Silicate fibre nee-dle mats are particularly preferred.

Preferably, the carrier layer contains a silicate fibre needle mat, the silicate fibres of which have fibre thicknesses in the range from 5 to 20 $\mu$m, preferably from 6 to 12 $\mu$m.

Furthermore, silicate fibre needle mats with a density of 120 to 180 kg/m$^3$, more preferably of 130 to 170 kg/m$^3$, even more preferably of 140 to 160 kg/m$^3$, even more preferably in the range of 150 kg/m$^3$, are preferably used.

The silicate fibre needle mat to be used according to the invention preferably has a nominal basis weight of 200 to 2000 g/m$^2$, more preferably 250 to 1500 g/m$^2$, more preferably 300 to 1000 g/m$^2$, still more preferably 350 to 500 g/m$^2$.

The silicate fibre needle mat to be used according to the present invention has fibres with a nominal thickness of preferably 2 to 15 mm, more preferably 3 to 12 mm, still more preferably 4 to 8 mm.

The silicate fibre needle mat to be used according to the invention has a thermal con-ductivity preferably selected from the group consisting of 0.038 to 0.046 W/mk (100° C.), 0.048 to 0.056 W/mk (200° C.), 0.061 to 0.69 W/mk (300°

C.), 0.78 to 0.86 W/mk (400° C.), 0.094 to 0.102 W/mk (500° C.), 0.115 to 0.123 W/mk (600° C.), 0.144 to 0.152 W/mk (700° C.), 0.171 to 0.179 W/mk (800° C.) and 0.186 to 0.194 W/mk (900° C.).

Silicate fibre needle mats are in principle commercially available and are usually pro-duced by means of needle technology and preferably without the addition of binders. The silicate fibre needle mats are preferably formed exclusively from silica glass fibres, wherein the silica glass fibres are made of at least 94 wt. % $SiO_2$, further preferably at least 96 wt. % $SiO_2$, so that the resulting silicate fibre needle mat has sufficient temperature resistance. The silicate fibre needle mats proposed according to the present invention are characterised by excellent thermal insulation properties as well as good vibration resistance. They have very good chemical resistance, high physical properties and high mechanical load-bearing capacity, which makes their use as a substrate material particularly preferable, since the composite system according to the present invention must preferably be plastically deformable in order to adapt to the three-dimensional shape of a battery or battery housing.

The above-mentioned properties of the silicate fibre needle mat preferred according to the present invention lead to the desired good insulation properties of the composite system according to the present invention at high temperatures. When a silicate fibre needle mat with the above properties is used in the manufacture of the composite system according to the present invention, the increase in density (e.g. by compression in the manufacturing process according to the present invention) leads to a further improve-ment in the insulation of thermal radiation. A silicate fibre needle mat with a Si fibre con-tent of at least 94 or 96 wt. % $SiO_2$ can withstand very high temperatures and thus resist burn-through more than other fibres.

In the context of the present invention, it has been found to be particularly preferred if the carrier layer is not formed by a silicate fibre needle mat alone, but comprises two discrete layers, namely the silicate fibre needle mat described above and additionally a stainless steel foil. In this embodiment of the present invention, the stainless steel foil is preferably a stainless steel foil made of VA steel.

The stainless steel foil preferably has a layer thickness of from 0.02 to 0.40 mm, more preferably from 0.08 to 0.22 mm, more preferably from 0.10 to 0.20 mm, still more pref-erably from 0.12 to 0.18 mm. A stainless steel foil is particularly advantageous in the composite system accord-ing to the present invention as a puncture barrier for burning metal particles.

In particular, the selection of the layer thickness of the stainless steel foil may be relevant to the present invention. On the one hand, a balance has to be found between a sufficient layer thickness, so that a sufficient flame protection and a sufficient puncture barrier is given, and a consideration of the weight of the stainless steel foil. This balance is struck in particular with the above layer thicknesses.

In addition, the stainless steel foil made of VA steel specifically proposed according to the proposed invention brings surprising advantages. A stainless steel foil made of VA steel creates a mechanical stability in the resulting composite body, so that the possibility of a three-dimen-sional embossing remains. Compared to the textile compo-nents used in the composite system according to the present invention, the stainless steel foil made of VA steel shows essentially no recovery behaviour.

It has been shown that the proposed selection of the carrier material from a silicate fibre needle mat and a stainless steel foil results in a dimensionally stable composite system. The preferred silicate fibre needle mat according to the present invention has the advantage that the resulting composite system is plastically deformable.

In a further embodiment, a random fibre nonwoven can also be used, which is composed of fibres coated with aluminium. Random fibre nonwovens, also referred to as random layer nonwovens or random nonwovens, are non-wovens in which the staple fibres or the filaments can assume any direction, i.e. they are relatively equal distrib-uted in all directions of the nonwoven.

Layer Designed as Fire Protection Fleece (=Fire Protection Layer)

The fire protection layer preferably comprises a non-woven or woven glass fibre fabric coated with a fire pro-tection composition comprising the at least one ablative compound.

In the context of the present invention, the term fire protection fleece is used synonymously for a glass fibre fleece or a glass fibre fabric.

Preferably, the glass fibre fleece or the glass fibre fabric contains glass fibres made of AES glass, E glass, ECR glass, silica glass, S glass, R glass, M glass, C glass, D glass, AR glass, T glass and/or Q glass. E-glass is preferred here.

According to the invention, the glass fibre fleece or the glass fibre fabric are selected in such a way that the resulting composite system is plastically deformable. Corresponding materials for the glass fibre fleece or the glass fibre fabric are known to the skilled person per se.

Preferably, the fire protection layer contains a glass fibre fleece. Glass fibre fleeces are known in many designs and for various applications. Also known are processes for the production of glass fibre fleeces from glass fibres and binder as well as possibly further additives. The additives can improve certain properties, for example the hot water resis-tance, of the finished glass fibre fleece.

It is preferred that the basis weight of the glass fibre fleece is between 40 g/m² and 60 g/m².

The glass fibres of the glass fibre web preferably have a length in the range of 2 mm to 10 mm, more preferably in the range of 3 to 8 mm, still more preferably in the range of 4 to 7 mm.

As far as the binder of the glass fibre fleece is concerned, there is considerable scope here. Particularly advantageous binders are urea resins, modified polyvinyl alcohol, poly-acrylic acid, water glasses, PU binders and mixtures of the aforementioned binders. A modified polyvinyl alcohol is particularly preferred as a binder.

The glass fibre fleece or the glass fibre fabric is coated with a fire protection composition. The fire protection com-position necessarily contains at least one ablative com-pound. It is particularly preferred that the glass fibre fleece or the glass fibre fabric contains two or more ablative compounds.

Due to the porosity of the glass fibre fleece or glass fibre fabric, the fire protection composition can penetrate into the fleece or fabric. Depending on the type of coating or impregnation of the fleece or fabric, the result is a single-layer structure of glass fibre fleece/glass fibre fabric and coating composition or a two-layer structure in which the fleece/fabric and the fire protection composition are still present separately.

In the context of the present invention, some penetration of the fire retardant composition is desirable because pen-etration results in improved entrapment of the fire retardant composition in the nonwoven, making it more stable overall and less likely to flake off.

An ablative compound is a compound that has a cooling effect when exposed to heat. In the process, bound water is released by endothermic processes and a cooling effect is produced. To achieve this ablative cooling, the ablative compound used can preferably be one that is ceramicizing, carbonising, subliming or inflatable. In a preferred embodiment, at least one ablative compound that ceramizes is used. The ceramicization prevents, for example, flames from breaking through.

Preferred ablative-acting compounds are selected from the group consisting of $LiNO_3 \cdot 3H_2O$, $Na_2CO_3H_2O$ (thermonatrite), $Na_2CO_3 \cdot 7H_2O$, $Na_2CO_3 \cdot 10H_2O$ (soda), $Na_2Ca (CO_3)_2 \cdot 2H_2O$ (pirssonite), $Na_2Ca(CO_3)_2 \cdot 5H_2O$(gaylussite), $Na(HCO_3)Na_2CO_3 \cdot 2H_2O$ (trona), $Na_2S_2O_3 \cdot 5H_2O$, $Na_2O_3Si \cdot 5H_2O$, $KF \cdot 2H_2O$, $CaBr_2 \cdot 2H_2O$, $CaBr_2 \cdot 6H_2O$, $CaSO_4 \cdot 2H_2O$ (gypsum), $Ca(SO_4) \cdot \frac{1}{2}H_2O$ (bassanite), $Ba(OH)_2 \cdot 8H_2O$, $Ni(NO_3)_2 \cdot 6H_2O$, $Ni(NO_3)_2 \cdot 4H_2O$, $Ni (NO_3)_2 \cdot 2H_2O$, $Zn(NO_3)_2 \cdot 4H_2O$, $Zn(NO_3)_2 \cdot 6H_2O$, $(ZnO)_2 (B_2O_3)_2 \cdot 3H_2O$, $Mg(NO_3)_2 \cdot 6H_2O$ (U.S. Pat. No. 5,985,013 A), $MgSO_4 \cdot 7H_2O$ (EP 1 069 172 A), $Mg(OH)_2$, $Al(OH)_3$, $Al(OH)_3 \cdot 3H_2O$, $AlOOH$ (boehmite), $Al_2[SO_4]_3 \cdot nH_2O$ mit $n=_{14\text{-}18}$, $KAl(SO_4)_2 \cdot 12H_2O$ (EP 1 069 172 A2), $CaO \cdot Al_2O_3 \cdot 10H_2O$ (nesquehonite), $MgCO_3 \cdot 3H_2O$ (wermlandite), $Ca_2Mg_{14}(Al,Fe)_4CO_3(OH)_{42} \cdot 29H_2O$ (thaumasite), $Ca_3Si(OH)_6(SO_4)(CO_3) \cdot 12H_2O$ (artinite), $Ca_6Al_2[(OH)_{12}|(SO_4)_3] \cdot 26H_2O$ (ettringite), $3CaO \cdot Al_2O_3 \cdot 3CaSO_4 \cdot 32H_2O$ (hydromagnesite), $Mg_5(OH)_2(CO_3)_4 \cdot 4H_2O$ (hydrocalumite), $Ca_4Al_2(OH)_{14} \cdot 6H_2O$ (hydrotalcite), $Mg_6Al_2 (OH)_{16}CO_3 \cdot 4H_2O$ alumohydrocalcite, $CaAl_2(OH)_4 (CO_3)_2 \cdot 3H_2O$ (scarbroite), $Al_{14}(CO_3)_3(OH)_{36}$ (hydrogarnet), $3CaO \cdot Al_2O_3 \cdot 6H_2O$ (dawsonite), $NaAl(OH)CO_3$, $Al(OH)_3$ (hydrargillite, ATH, hydrous zeolites, vermiculites, colemanites, perlites, mica, alkali silicates, borax, modified carbons, graphites, silicas and mixtures thereof.

In a preferred embodiment of the invention, the ablative compound comprises mica, ver-miculite and/or ettringite, in particular mica, vermiculite and/or synthetic ettringite.

In a preferred embodiment of the invention, the ablative compound comprises ettringite.

In a very preferred embodiment of the invention, the ablative compound comprises synthetic ettringite.

Ettringite ($Ca_6$ $Al_2[(OH)_{12}$ $[(SO)_{43}]$-26 $H_2O$) is a rarely occurring mineral from the mineral class of hydrous sulphates with foreign anions. Synthetic ettringite is available, for ex-ample, in the form of aqueous suspensions. The aqueous suspensions may further comprise organic polymer-based binders, such as acrylates.

In another preferred embodiment of the invention, the ablative compound comprises $Al(OH)_3$ (hydrargillite, ATH).

$Al(OH)_3$ splits off at temperatures above 200° C. into aluminium oxide and water. The water cools the source of the fire and dilutes the gases produced. The resulting aluminium oxide forms a protective ceramic layer.

In a preferred embodiment, the fire protection composition comprises two or more ablative compounds. It is further preferred that the fire-retardant composition comprises two ablative-active compounds. In this case, it is particularly preferred that the ablative com-pound comprises synthetic ettringite and $Al(OH)_3$.

The amount of ablative compound in the fire-retardant composition is preferably at least 50% by weight, more preferably at least 60% by weight, even more preferably at least 70% by weight and most preferably at least 75% by weight, in each case based on the total weight of the fire-retardant composition.

In order to improve the application properties of the fire protection composition and/or the fire protection effect of the fire protection layer, the fire protection composition may contain further ingredients.

These further ingredients may in particular include defoaming agents, solvents, binders, thickeners and/or expanded glass.

To prepare the fire protection composition, the ingredients are homogenised in a dis-solver at room temperature (25° C.).

The fire protection composition is applied to the surface of the glass fibre fleece or the glass fibre fabric on one side. This can be done, for example, by means of squeegees or rollers. The coated glass-fibre fleece or glass-fibre fabric is then dried, for example with the aid of a drying tunnel at temperatures of around 190° C.

It is preferred that the basis weight of the fire protection layer is between 400 $g/m^2$ and 600 $g/m^2$. This weight per unit area is advantageous in the context of the present inven-tion because it enables a process-safe application on the glass fibre fleeces to be used with a weight per unit area between 40 $g/m^2$ and 60 $g/m^2$. The weight per unit area of the glass fibre fleece and the fire protection composition must preferably be matched to each other, while at the same time taking into account the resulting thickness of the composite system and the material properties (no porous structures should be formed).

In a further embodiment, the carrier layer of the compos-ite system according to the invention can also be composed of one or more of the fire protection layers described above. If the carrier layer is constructed from several of the fire protection layers described above, these are preferably bonded to each other via an adhesive layer described below.

Adhesive Layer

The layers described above, but also all other layers of the composite system according to the present invention, are preferably bonded together via one or more adhesive layers.

The adhesive layers in the context of the present invention are preferably based on a hot melt adhesive; the individual layers are thus bonded to each other via a hot melt lamina-tion.

In this case, the hot melt adhesive can be a physically setting thermoplastic adhesive or a chemically setting ther-moset adhesive.

The hot melt adhesive is preferably selected from the group consisting of rubber based hot melts, polyamide based hot melts, polyolefin based hot melts, ethylene vinyl acetate based hot melts and polyurethane based hot melts.

For the application purpose according to the present invention, it is generally preferred if the hot melt adhesive is designed in such a way that it can be sprayed onto the respective layers of the composite system.

In the context of the present invention, it is further preferred if the hot melt adhesive has a short open time and is pressure sensitive.

It is also preferred if the hot melt is permanently adhesive. Due to the possibly required three-dimensional deformation of the composite system according to the present invention, a loss of contact of areas of adjacent layers can occur during the deformation, which can be compensated later due to the permanently formed adhesive effect.

The respective adhesive layer can also contain, for example, a thermoplastic polymer film, synthetic rubber, water glass, polyurethane, or acrylate. Depending on the ingredient and filler materials, a distinction is made between a thermoplastic adhesive layer, a spray adhesive layer (syn-thetic rubber), an acrylate adhesive layer or a fire protection adhesive layer (water glass). Suitable thermoplastic polymers include, for example, acrylonitrile butadiene styrene (ABS), polyamides (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK) and polyvinyl chloride (PVC). Particularly preferably, the adhesive layer contains a thermoplastic polyethylene film.

This adhesive layer is used between individual layers of the composite system according to the present invention or only between some layers of the composite system according to the present invention.

Component for Shielding Electrical, Magnetic and/or Electromagnetic Radiation

In the context of the present invention, the composite system according to the present invention comprises at least one component for shielding electrical, magnetic and/or electromagnetic radiation.

The present invention provides two embodiments for this shielding of electrical, magnetic and/or electromagnetic radiation, which will now be described in the following.

First Embodiment

The component provided according to the present invention for electrical, magnetic and/or electromagnetic shielding can at first be formed by a metal foil which enables effective shielding from electromagnetic radiation. The metal foil may preferably be a copper foil or an aluminium foil or a nickel foil or a silver foil or a gold foil or a foil made of an iron-based material (e.g., a stainless steel alloy).

In a preferred aspect of this first embodiment of the present invention, the component is formed by an aluminium foil or an aluminium strip. According to the EN 485-2 standard, an aluminium foil differs from an aluminium strip by the layer thickness (up to 0.20 mm layer thickness (aluminium foil) vis-à-vis more than 0.20 mm layer thickness (aluminium strip)).

In the following, both terms are referred to together as aluminium foil.

In this first embodiment of the composite body according to the present invention, the composite body thus comprises at least one aluminium foil. In addition, however, it is also possible for the composite system according to the present invention to comprise two or more aluminium foils.

For sufficient shielding of the composite body according to the invention, aluminium foils are preferably used which have a layer thickness of 0.1 to 0.5 mm, further preferably 0.15 to 0.45 mm, still further preferably 0.20 to 0.40 mm.

Structure of the composite system according to the present invention in the composite systems according to the present invention described below, it is preferably provided that the aluminium foil is directly adjacent to at least one fire protection layer (in the sense of the present invention; see above), whereby an adhesive layer may be provided between the fire protection layer and the aluminium foil.

In the context of the present invention, the term "immediately adjacent" is generally understood to mean that the layers described are adjacent but may be bonded together by an adhesive layer. This does not only apply to the specific design of an aluminium foil and a fire protection layer, but to any other sequence of layers.

The composite system according to the present invention may also comprise at least two fire protection layers (in the sense of the present invention; see above) and at least two aluminium foils for shielding, wherein one aluminium foil is arranged directly adjacent to each of the fire protection layers.

In this structure, too, the aluminium foils can each be bonded to the fire protection layer via an adhesive layer.

First Aspect of the First Embodiment

A possible structure of the composite system according to the present invention results in such a way that the aluminium foil(s) is/are provided on the opposite side(s) of the fire protection layers(s) to the carrier layer (which is foreseen between the fire protection layers), wherein the carrier layer can consist, for example, of the silicate fibre needle mat described above and the stainless steel foil described above and the carrier layer can be arranged between two fire protection fleeces.

If, in the context of the present invention, it is assumed that there is a composite system comprising a carrier layer, for example consisting of the silicate fibre needle mat described above and the stainless steel foil described above, and two fire protection fleeces, the composite system may comprise two aluminium foils enveloping the layer structure consisting of the fire protection fleeces and the carrier layer.

In this aspect, it can thus be provided that the aluminium foils encase a layered structure consisting of a first fire protection layer, which is provided adjacent to a carrier layer, the carrier layer being provided with a further fire protection fleece on the side opposite the first fire protection layer.

In this embodiment, it may thus further be provided that the aluminium foils enclose a layered structure consisting of a first fire protection layer which is provided adjacent to a carrier layer, wherein the carrier layer comprises the previously described silicate fibre needle mat and the previously described stainless steel foil, and wherein the carrier layer is provided with a further fire protection layer on the side opposite to the first fire protection fleece.

In this embodiment, the aluminium layers are in particular directed outwards and have at least the support layer and the fire protection layer on one side of the aluminium layers.

Accordingly, a composite system as described above is claimed in which the following layer structure is realised:

a1) Aluminium foil, adjacent to b1) Fire protection layer, adjacent to c1) Support layer, adjacent to d1) Fire protection layer, adjacent to e1) Aluminium foil;

wherein the individual layers a1) to a1) can each be bonded to one another via an adhesive layer as described above and the aluminium foil envelops the layers b1) to d1) in particular without any further adhesive layer(s).

Accordingly, a composite system as described above is claimed in which the following layer structure is realised:

a2) Aluminium foil, adjacent to b2) Fire protection layer, adjacent to c2.1) Silicate fibre needle mat, adjacent to c2.2) Stainless steel foil, adjacent to d2) Fire protection layer, adjacent to;

e2) Aluminium foil, wherein the individual layers b2) to d2) (including c2.1 and c2.2) can each be bonded to one another via an adhesive layer as described above and the aluminium foil envelops the layers b2) to d2) (including c2.1 and c2.2) in particular without any further adhesive layer(s).

When two aluminium foils are used in the context of the present invention, which wrap the layers b1/b2) to d1/d2)

(with c1) or c2.1) and c2.2)), the two aluminium foils are preferably crimped together at the edge.

In this aspect, the resulting composite body with the aforementioned layers a1/a2) to e1/e2) (with c1) or c2.1) and c2.2)) can be used as an integrated battery housing; an additional use of a battery housing, for example made of a plastic, is not mandatory, but possible. In the case that the layered structure a1/a2) to e1/e2) (with c1) or c2.1) and c2.2)) according to the present invention is used as battery housing, the battery is arranged adjacent to one of the two aluminium foils, since the layered structure of the composite system according to the present invention is symmetrical.

In this embodiment, the resulting composite body with the aforementioned layers a1/a2) to e1/e2) (with c1) or c2.1) and c2.2)) can also be used only as the lid of a battery housing, the remaining part of the battery housing being formed by a plastic usually used in the battery sector.

Second Aspect of the First Embodiment

In a second aspect of the first embodiment, the composite system according to the present invention may have the following layered structure, wherein the individual layers are preferably formed as described above:
    a3) Stainless steel foil,
    b3) Fire protection layer,
    c3) Support layer, preferably of a silicate fibre needle mat as described above,
    d3) Fire protection layer,
    e3) Aluminium foil.

In the case where an aluminium foil and/or a stainless steel foil is used for electromagnetic shielding, which is located outside the arrangement of fire protection layer(s) and carrier layer(s) in the composite material, i.e. directed outwards, the electromagnetic shielding is better than in the case where corresponding aluminium layers and/or stainless steel layers are located inside and are enclosed by fire protection layer(s) and/or carrier layer(s).

This advantage also applies to the first aspect mentioned above in which the aluminium foils are also located outside the arrangement of fire protection layer(s) and carrier layer(s) in the composite material, i.e. directed outwards.

A further variant of the second aspect of the first embodiment relates to a composite system according to the present invention comprising the following layer structure, wherein the individual layers are preferably formed as described above:
    a4) Stainless steel foil,
    b4) Fire protection layer,
    c4) Aluminium foil,
    d4) Support layer, preferably of a silicate fibre needle mat as described above,
    e4) Fire protection layer,
    f4) Stainless steel foil.

The layered structure of the two aspects mentioned above (a1) to e1); a2) to e2); a3) to e3) and a4) to f4)) of the composite system according to the present invention is suitable for installation in a lid of a battery container.

In particular, the layered structure of the second embodiment of the composite system according to the present invention is suitable for installation in a cover of a battery housing. Battery housings in an electric car are important components responsible for accom-modating and protecting the high-performance battery. These housings play a crucial role in the safety, efficiency and durability of the electric vehicle.

Battery receptacles, also known as battery cases or battery pack cases, are the robust enclosures, usually made of aluminium or other lightweight and durable materials such as plastics, that surround the high-performance batteries of an electric car. They have several important functions:

The housing protects the sensitive battery cells from external influences such as moisture, shocks, vibrations, temperature fluctuations and mechanical damage. The housing also serves as a heat sink to protect the batteries from overheating. Often, cooling channels and heat exchangers are integrated into the enclosures to keep the batteries at optimal operating temperature. The battery containers are also designed to protect the battery cells in the event of accidents or collisions and to prevent leakage of battery fluids. In this way, the battery receptacles contribute to the structural integrity of the vehicle by acting as a load-bearing element and increasing the torsional rigidity of the car.

Battery containers, as already indicated, are usually made of aluminium, which is particularly suitable due to its lightness and high strength, or of plastic. In the case of alumin-ium, the construction mostly comprises welded or cast panels that are joined to form a stable housing. The shape of the housing is carefully designed to provide space for the battery packs while supporting the structure of the vehicle.

These battery containers usually have opening lids through which the high-capacity batteries are inserted into the container.

In the context of the present invention, these lids may have integrated the composite systems of the invention described above and be plastically adapted to the housing with these.

Second Embodiment

In a second embodiment, the shielding of electrical, magnetic and/or electromagnetic radiation may be provided by aluminium-coated glass or basalt fibres.

These aluminium-coated fibres are composite materials consisting of glass or basalt fibres with an aluminium coating. This coating gives the fibres additional properties and application possibilities.

The coating is usually applied to the surface of the fibres by thermal vapour deposition or spraying of aluminium. The aluminium coating improves the mechanical properties of the fibres in several ways:

The coating increases the tensile strength of the fibres, making them suitable for applications with high mechanical loads. Coated fibres have improved flexural strength, which favours their use in structural applications. The aluminium coating contributes to the in-creased impact strength of the fibres, making them resistant to mechanical stress.

The aluminium coating also improves the fibres' ability to withstand heat and high temperatures. This makes them suitable for applications where heat protection is required, such as in fire protection. In addition, the aluminium coating has an electrically shielding effect.

The aluminium coating additionally provides a degree of corrosion resistance, making coated fibres suitable for applications in corrosive environments.

The diameter of the filaments used on glass or basalt fibres is preferably 5 to 24 μm.

The aluminium coating preferably has a thickness of 0.1 to 3 μm, which on the one hand achieves good shielding, but at the same time also ensures processability.

The filament fibre length is preferably 1 to 20 mm.

Also in this second embodiment, it is preferred that the materials which provide electromagnetic shielding are directed outwards and are preferably located outside the arrangement of fire protection layer(s) and carrier layer(s) in the composite material.

In the second embodiment, a composite system according to the invention, which is constructed, for example, from the layers described above (a1) to e1), a2) to e2), a3) to e3) or a4) to f4)), can be covered on at least one side by a housing part formed from plastic, wherein glass or basalt fibres coated with aluminium are incorporated into the housing part formed from plastic.

In the second embodiment, a composite system according to the invention, which is constructed, for example, from the layers described above (a1) to e1), a2) to e2), a3) to e3) or a4) to f4)), can be completely enclosed by a housing part formed from plastic, wherein glass or basalt fibres coated with aluminium are incorporated into the housing part formed from plastic.

This integration of the composite system according to the invention in a housing part, in particular in a housing cover, is advantageous according to the invention, since the fire protection or the electromagnetic shielding can be provided directly during the construction.

Should the composite system according to the present invention be integrated in a battery housing part which contains the glass or basalt fibres coated with aluminium, the use of the aluminium layers in the aforementioned layer sequences can also be dispensed with.

This housing part formed from plastic can usually be produced by injection moulding, whereby the corresponding glass or basalt fibres coated with aluminium are already added to the plastic granulate.

In a variant of the second embodiment, the aluminium-coated glass or basalt fibres are the same as fibres of glass or basalt coated with an aluminium coating.

In a further variant of the second embodiment, the aluminium coated glass or basalt fibres are the same as fibres of glass or basalt coated with an aluminium coating and wherein the fibre core is formed of fused, thin drawn basalt or glass coated with aluminium.

In this second embodiment, the composite system according to the invention thus comprises the following layers:

a) Plastic layer with aluminium coated glass or basalt fibres, adjacent to
b) Fire protection fleece, adjacent to
c) Support layer, adjacent to
d) Fire protection fleece.
or
a) Plastic layer with aluminium coated glass or basalt fibres, adjacent to
b) Fire protection fleece, adjacent to
c) Support layer, adjacent to
d) Fire protection fleece, adjacent to
e) Plastic layer with aluminium coated glass or basalt fibres, wherein the backing layer comprises or consists of
c1) a silicate fibre needle mat, adjacent to
c2) a stainless steel foil
or
a) Stainless steel foil,
b) Fire protection layer,
c) carrier layer, preferably of a silicate fibre needle mat as described above,
d) Fire protection layer,
e) Aluminium foil.

16 or
a) Stainless steel foil,
b) Fire protection layer,
c) Aluminium foil,
d) carrier layer, preferably of a silicate fibre needle mat as described above,
e) Fire protection layer,
f) Stainless steel foil.

Within the framework of this composite system, the plastic layers can be bonded to each other at the edge with the inclusion of the above-mentioned layers according to a) to e) or a) to f).

The plastic layer can preferably be produced by injection moulding materials.

The total thickness of the composite system according to the invention may be 1 to 15 mm, more preferably 2 to 12 mm, still more preferably 3 to 10 mm.

Arrangement of the Composite System According to the Present Invention

In particular, it is envisaged that the composite system with the fire protection layer containing the at least one ablative compound is arranged in direct contact with the battery.

In the context of the present invention, the feature "of direct contact with the battery" is understood to mean that no further layer of the composite system according to the invention is provided between the (outside of the) battery and the composite system; contact between the battery housing and the fire protection layer is not mandatory, so that an adhesive layer can also be provided between the composite system according to the present invention and the battery.

If, in the context of the present invention, a direct arrangement of the fire protection layer on the battery housing is provided, it is avoided that the functioning of the ablative-active compound contained in this fire protection layer is accompanied by a bursting of the composite system used in the event of fire. Therefore, it is advantageous for the present invention if the layer containing the ablative compound, i.e., the fire-protection layer, is in direct contact with the material of the battery housing.

In the case of using an aluminium layer to create a shield, where the aluminium layers form the shell around the fire protection layer(s) and carrier layer(s), the composite system naturally exists via an aluminium layer in conjunction with the battery.

Alternatively, the fire protection device can be designed as a transport container and serve, for example, as a transport bag for lithium-ion batteries. In this embodiment, the fire protection device preferably has an opening, for example a positive closure device such as a zip or a Velcro fastener, through which the battery pack can be inserted and removed.

If the fire protection device according to the invention is designed as a transport container, it is preferred if the fire protection device has a plastic deformability. For this purpose, a special carrier material is recommended, as described above.

The fire protection device comprises a composite system and, if applicable, a shell inside which the composite system is arranged.

In particular, the burning device may be in the form of a mat or plate and may be part of a battery pack for use in a portable device (for example, a smartphone or a tablet computer) or an electric vehicle. In particular, the burning device may be part of a battery pack with at least one rechargeable lithium ion battery cell for use in a portable device or an electric vehicle.

Accordingly, a further subject-matter of the present invention is a battery pack comprising (i) a housing, (ii) at least one rechargeable lithium-ion battery cell and (iii) one of the the composite system as described above adjacent in the housing to the at least one rechargeable lithium-ion battery cell.

In this battery pack of the present invention, the compound system according to the present invention is preferably arranged in the direction of the rechargeable lithium ion battery cell.

Regarding preferred embodiments of the battery pack, the same applies mutatis mutandis as to the component system according to the present invention described above.

Rechargeable lithium battery cells include, in particular, rechargeable lithium cobalt di-oxide battery cells, rechargeable lithium titanate battery cells, rechargeable lithium manganese battery cells, rechargeable lithium iron pho s phat battery cells, rechargeable lithium air battery cells, rechargeable dual carbon battery cells and/or lithium polymer battery cells. Typically, a battery pack has multiple rechargeable lithium battery cells connected in series. The battery pack may contain other components. In particular, a battery management system (BMS) is included as a further component. The battery management system is preferably an electronic circuit which serves to monitor, control and protect the rechargeable lithium-ion battery cell(s). Battery packs are usually designed to be replaceable and have detachable electrical contacts.

A further subject of the present invention is a process for the production of a composite body according to the present invention. In the process according to the invention (1) the individual layers, as defined above, are each successively provided and (2) each individual layer is bonded to each other via an adhesive layer according to the above specification.

In a third step of the process, the laminated layers are (3) connected to each other under pressure application.

Should the above first embodiment of an aluminium foil for EMC shielding be applied in the context of the present invention, the method according to the invention additionally comprises the following method steps:

(4) where appropriate, shaping the assembly of layers resulting from the process step (3), the layers of aluminium foil forming the two outer layers of the assembly having a larger surface area than the other inner layers; and (5) Flanging of the two outer aluminium foils with complete inclusion of the remaining inner layers.

A further subject of the present invention is the use of a fire protection device according to the present invention in a device comprising at least one rechargeable lithium ion battery cell.

With regard to preferred embodiments of use, what has been said for the fire protection device and the battery pack applies mutatis mutandis.

The present invention is illustrated again in more detail with reference to the following embodiments:

Examples

A composite system according to the present invention is produced as shown in FIG. 1, in which the reference signs have the following meaning:

1: First layer of fire protection fleece

2: VA stainless steel foil

3: Silicate fibre needle mat

4: Second layer of fire protection fleece

5: Layer of a pressure-sensitive hot-melt adhesive

The individual layers are provided in sequence and bonded to the adjacent layer using a Follmann synthetic polymer-based pressure-sensitive adhesive (FOLCO® MELT PSA H4402). The layers of hotmelt adhesive are each shown as discrete layers in FIG. 1, but can run with this layer, especially when penetrating into the fire protection fleece.

Figure 2:
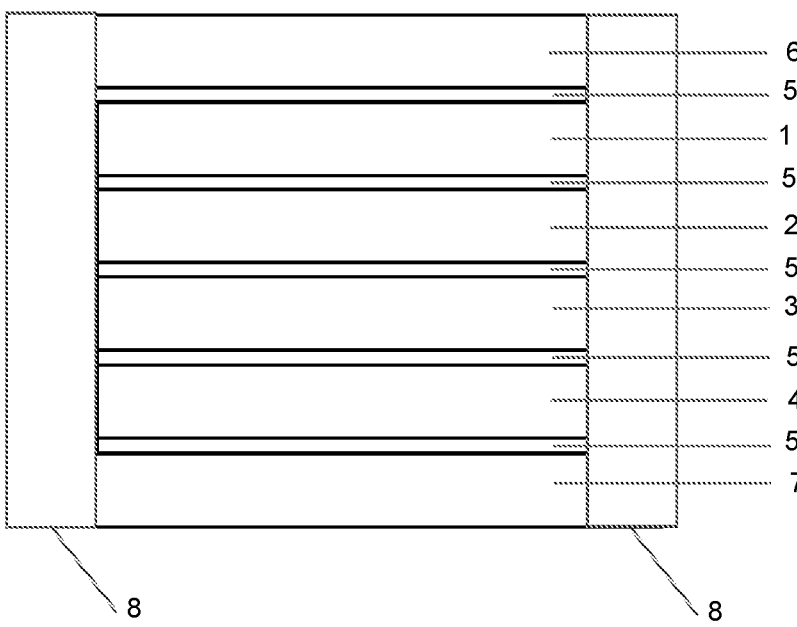
FIG. 2 shows a schematic illustration of a composite system, according to an embodiment.

FIG. 2 shows a composite system according to the invention, in which the composite system according to FIG. 1 is provided on the upper and lower sides with

6: A first aluminium layer and

7: A second aluminium layer is provided. The

8: Edges of the aluminium layer extend across the width of layers 1 to 5, so that the two aluminium layers are joined together by flanging (only shown schematically in FIG. 2).

Figure 3:
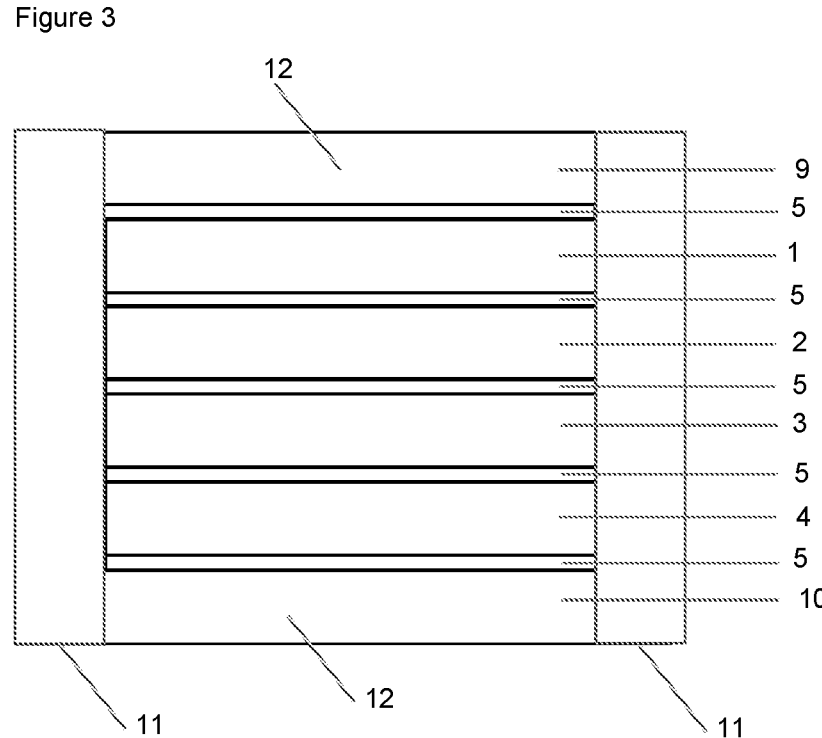
FIG. 3 shows a schematic illustration of a composite system, according to an embodiment.

FIG. 3 shows a composite system according to the present invention, in which the composite system according to FIG. 1 is provided on the upper and lower side with

9: A first plastic layer and

10: a second plastic layer

The

11: Edges of the plastic layer extend across the width of layers 1 to 5, so that the two plastic layers are joined together, for example by injection moulding (only shown schematically in FIG. 3).

In the first and second plastic layers are

12: glass fibres coated with aluminium.

The invention claimed is:

1. A composite system comprising at least one carrier layer including a silicate fibre needle mat and a stainless steel foil;

at least one fire protection layer; and at least one component for shielding at least one from the group consisting of electrical, magnetic, and electromagnetic radiation, the at least one component for shielding formed by at least one from the group consisting of (1) an aluminium foil placed outside the at least one carrier layer and the at least one fire protection layer and (2) at least one from the group consisting of glass fibres coated with metal and basalt fibres coated with metal.

2. The composite system according to claim 1, wherein the at least one from the group consisting of glass fibres coated with metal and basalt fibres coated with metal are coated with aluminium and have at least one of the following parameters:

i) a filament diameter of 5 to 24 μm;

ii) a thickness of the aluminium coating of 0.1 to 3 μm; and iii) a filament fibre length of 1 to 20 mm.

3. The composite system according to claim 1, wherein the silicate fibre needle mat and the stainless steel foil are directly adjacent.

4. The composite system according to claim 1, wherein the at least one fire protection layer comprises a glass fibre fabric.

5. The composite system according to claim 4, wherein the glass fibre fabric is coated with a fire protection composition.

6. The composite system according to claim 4, wherein the glass fibre fabric is provided with a fire-protection composition that contains, as binders, urea resins, modified polyvinyl alcohol, polyacrylic acid, water glasses, PU binders and mixtures of the aforementioned binders and at least one ablative compound, the ablative compound being ceramifying, carbonizing, sublimating, or expandable under the action of heat.

7. The composite system according to claim 4, wherein the glass fibre fabric is impregnated with a fire protection composition.

8. The composite system according to claim 1, wherein the at least one component for shielding includes at least one foil of aluminium.

9. The composite system according to claim 1, wherein the composite system has the following layer structure:
  a) aluminium foil, adjacent to
  b) a layer designed as a fire protection fleece, adjacent to the
  c) carrier layer, adjacent to
  d) a layer designed as a fire protection fleece, adjacent to the
  e) aluminium foil.

10. A composite system according to claim 1, wherein the at least one component for shielding includes at least one from the group consisting of aluminium-coated glass fibres and aluminium-coated basalt fibres.

11. The composite system according to claim 10, wherein the at least one from the group consisting of coated glass fibres and aluminium-coated basalt fibres are present in a plastic layer that surrounds the at least one fire protection layer and the at least one carrier layer.

12. A method of producing a composite system according to claim 1, wherein the individual layers are provided and bonded together by means of a hot-melt adhesive and under the action of pressure.

* * * * *